US009752695B2

(12) United States Patent
Koukan et al.

(10) Patent No.: US 9,752,695 B2
(45) Date of Patent: Sep. 5, 2017

(54) OPERATING FLUID RESERVOIR HAVING AN INTEGRATED VENTING AND/OR AIR ADMISSION VALVE

(71) Applicant: KAUTEX TEXTRON GMBH & CO., KG, Bonn (DE)

(72) Inventors: Ibrahim Koukan, Cologne (DE); Roland Linsenboll, Sankt Augustin (DE); Jaroslav Maglovski, Lohmar (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 14/910,782

(22) PCT Filed: Jul. 30, 2014

(86) PCT No.: PCT/EP2014/066350
§ 371 (c)(1),
(2) Date: Feb. 8, 2016

(87) PCT Pub. No.: WO2015/018701
PCT Pub. Date: Feb. 12, 2015

(65) Prior Publication Data
US 2016/0201817 A1    Jul. 14, 2016

(30) Foreign Application Priority Data

Aug. 9, 2013    (DE) .................... 10 2013 013 213

(51) Int. Cl.
*F16K 31/18*    (2006.01)
*F16K 24/04*    (2006.01)
(Continued)

(52) U.S. Cl.
CPC ........ *F16K 24/04* (2013.01); *B60K 15/03519* (2013.01); *F16K 24/044* (2013.01);
(Continued)

(58) Field of Classification Search
CPC ............ B60K 15/035; B60K 15/03504; B60K 15/03519; B60K 15/03289;
(Continued)

(56) References Cited

U.S. PATENT DOCUMENTS 1,718,350 A * 6/1929 Greenwald et al. .. F16K 1/2085
137/516.27
4,449,976 A * 5/1984 Kamen ................ A61M 5/1411
137/192
(Continued)

FOREIGN PATENT DOCUMENTS

DE    4213992    11/1993
DE    19742469    4/1999
(Continued)

OTHER PUBLICATIONS

English language PCT International Search Report and Written Opinion mailed Dec. 17, 2014, received in corresponding PCT Application No. PCT/EP14/66350, 14 pgs.
(Continued)

*Primary Examiner* — Craig J Price
(74) *Attorney, Agent, or Firm* — Grossman, Tucker, Perreault & Pfleger, PLLC

(57) ABSTRACT

The present invention discloses an improved operating fluid reservoir (1) having a venting and/or air admission valve. The operating fluid reservoir (1) is characterized in that a valve housing (10) is formed integrally with an operating fluid reservoir wall (2). A vent opening (3), via which a valve housing interior (11) is in fluid communication with a vent line (5), is embodied as a through opening (3) through the operating fluid reservoir wall (2). A valve body (20), which is arranged in the valve housing interior (11), can be introduced into the valve housing interior (11) via an introduction opening (16) in the valve housing (10). The valve body (20) comprises a holding device (23; 14, 24), by means
(Continued)

Figure 1:
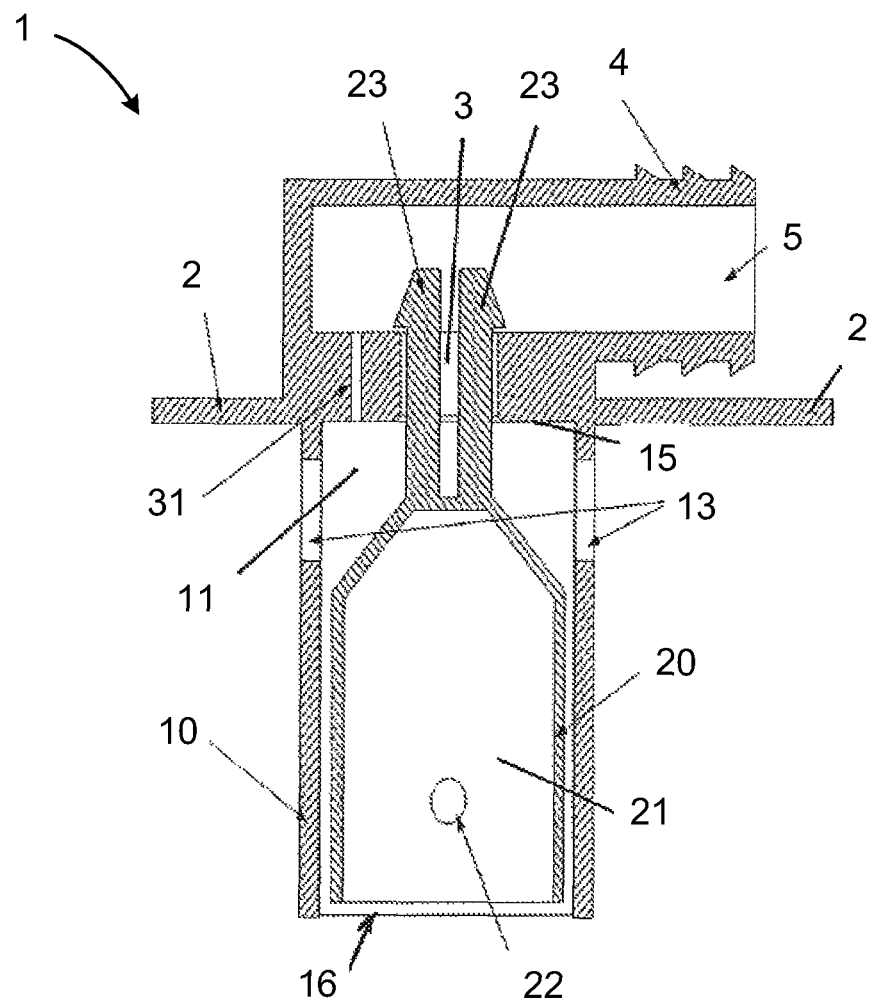

of which the valve body (20) is held movably in the valve housing (10).

14 Claims, 3 Drawing Sheets

(51) Int. Cl.
*B60K 15/035* (2006.01)
*B60K 15/03* (2006.01)
*B29C 45/00* (2006.01)

(52) U.S. Cl.
CPC .......... *B29C 2045/0093* (2013.01); *B60K 2015/03289* (2013.01); *B60K 2015/03453* (2013.01); *B60K 2015/03557* (2013.01); *B60Y 2304/05* (2013.01)

(58) Field of Classification Search
CPC  B60K 2015/03289; F16L 47/02; F16L 47/14; F02M 37/017; F02M 37/0076; F16K 24/04; F16K 24/06; F16K 27/07; F16K 24/044; Y10T 137/0874; Y10T 137/3099; Y10T 137/053; H01M 2/1205; H01M 2/368; B29L 2031/7172; B65D 51/1644; B65D 51/1633; B65D 51/16; B60Y 2304/05; B29C 2045/0093
USPC ..... 137/15.26, 38, 39, 43, 202, 315.08, 409, 137/429, 430, 587, 588; 220/86.2, 745, 220/746, 582, 202, 203.01; 141/59, 198, 141/202, 229; 123/516, 518, 198 D, 520; 206/0.6; 29/890.127, 890.13, 890.122, 29/DIG. 11
See application file for complete search history.

(56) References Cited

U.S. PATENT DOCUMENTS

| | | | | |
|---|---|---|---|---|
| 4,633,681 A * | 1/1987 | Webber | .......... | F25B 41/06 137/202 |
| 5,103,865 A * | 4/1992 | Hyde | .......... | B29C 49/20 137/318 |
| 5,253,668 A * | 10/1993 | Mills | .......... | B60K 15/03519 137/12 |
| 5,409,030 A * | 4/1995 | Sung | .......... | B60K 15/03519 137/202 |
| 5,567,296 A * | 10/1996 | Luch | .......... | B60K 15/03177 205/158 |
| 5,605,177 A * | 2/1997 | Ohashi | .......... | B60K 15/03519 123/516 |
| 6,347,640 B1 | 2/2002 | Meyer | | |
| 6,409,040 B1 * | 6/2002 | Distelhoff | .......... | B60K 15/03177 220/4.14 |
| 6,454,114 B2 * | 9/2002 | Straetz | .......... | B60K 15/03177 220/4.14 |
| 6,612,458 B2 * | 9/2003 | Balzer | .......... | B60K 15/03177 220/4.13 |
| 6,840,274 B1 * | 1/2005 | Williamson | .......... | B29C 45/14 137/588 |
| 7,600,652 B1 * | 10/2009 | Johansen | .......... | B29C 66/7234 220/582 |
| 8,147,232 B2 * | 4/2012 | Borchert | .......... | B29C 49/20 425/116 |
| 9,221,332 B2 * | 12/2015 | Gebert | .......... | B60K 15/03177 |
| 2002/0047015 A1 * | 4/2002 | Distelhoff | .......... | B60K 15/03177 220/562 |
| 2004/0231720 A1 | 11/2004 | Ruschke | | |
| 2010/0065134 A1 | 3/2010 | Miura | | |
| 2015/0096625 A1 * | 4/2015 | Mills | .......... | F16K 17/048 137/12 |

FOREIGN PATENT DOCUMENTS

| | | |
|---|---|---|
| DE | 102004024521 A1 | 12/2005 |
| DE | 102010004778 A1 | 7/2011 |
| EP | 1213173 A2 | 6/2002 |
| JP | 55-71052 | 5/1980 |
| JP | 2005-138763 | 6/2005 |

OTHER PUBLICATIONS

English language PCT International Preliminary Report on Patentability dated Sep. 8, 2015, received in corresponding PCT Application No. PCT/EP14/66350, 6 pgs.

English translation of Office Action from related Japanese Appln. No. 2016-521274 dated Jan. 30, 2017. (the "dispatch date" and "drafting date" have typographical errors and should be "2017" not "2016").

* cited by examiner

OPERATING FLUID RESERVOIR HAVING AN INTEGRATED VENTING AND/OR AIR ADMISSION VALVE

FIELD

The present invention relates to an operating fluid reservoir having an integrated venting and/or air admission valve, which can also be referred to as a shutoff valve, and to a method for producing a corresponding operating fluid reservoir.

An operating fluid reservoir can be a fluid reservoir for aqueous urea solution required for an SCR method (Selective Catalytic Reduction) for lowering nitrogen oxide emissions from diesel vehicles, for example. This aqueous urea solution is injected into the exhaust section from the SCR catalyst, e.g. by means of a dosing pump or an injector.

In the following text, reference will be made to an operating fluid reservoir designed as a fuel reservoir, although all the embodiments can also be used in a corresponding manner for fluid reservoirs for aqueous urea solution or more generally for operating fluid reservoirs.

BACKGROUND

To fill a fuel reservoir with fuel, a fuel pump nozzle is inserted into a filler pipe opening into the fuel reservoir, thereupon allowing fuel to be introduced into the fuel reservoir. To enable the fuel reservoir to be filled unhindered, the air in the fuel reservoir or the air/gas mixture in the fuel reservoir must be able to escape from the fuel tank since, otherwise, a pressure rise within the fuel tank would hinder the filling process.

To vent air from the fuel reservoir, one or more venting valves in fluid communication with a vent line are provided in the fuel reservoir, wherein the vent line is in turn in fluid communication with an activated carbon filter or a filler pipe head. Air/gas mixture displaced from the fuel reservoir is filtered by the activated carbon filter, ensuring that only small quantities of hydrocarbons, if any, are released to the environment.

Venting and/or air admission valves known from the prior art, which are also referred to below simply as venting valves or shutoff valves, comprise a hollow valve housing, which has at least one ventilation opening, by means of which a valve housing interior is in fluid communication with the environment thereof. When the venting valve is installed in a fuel reservoir, the valve housing interior is in fluid communication via the ventilation opening with the fuel reservoir interior, thus allowing an exchange of fuel vapour/air mixture between the fuel reservoir interior and the valve housing interior via the ventilation opening. The valve housing interior is in fluid communication with a vent line via a vent opening arranged in a valve seat. A valve body, which can move freely in the valve housing interior and is also referred to as a float, float element or buoyant element, closes the vent opening at and above a predetermined fuel level within the fuel reservoir, thus preventing gas escaping from the valve housing. Below the predetermined operating fluid level, the valve body is at a distance from the vent opening, with the result that the valve housing interior and the vent line are in fluid communication.

The distance between the operating fluid level and the fuel reservoir inner wall on which the venting valve is fastened at which the valve body is subject to so much lift by the fuel that it closes the vent opening is referred to as the shutoff height.

When the operating fluid level has reached the shutoff height, the valve body is subject to such lift from the operating fluid that the valve body closes the vent opening in the valve housing. If more fuel is introduced, the pressure within the operating fluid reservoir rises, with the result that the operating fluid level in the filler pipe rises and the filling process can be ended automatically at a given fluid level within the filler pipe.

In the case of operating fluid reservoirs known from the prior art, the venting and/or air admission valves are introduced into the operating fluid reservoir through an opening in an upper shell. The valve housing is then connected to the upper shell by a weld, an adhesive bond or in some other way. In order to produce a corresponding operating fluid reservoir, it is consequently always necessary to produce an opening in the upper shell and then to connect the valve housing to the upper shell in an additional method step. It is furthermore necessary to attend to the leak tightness of the connection between the valve housing and the upper shell of the tank.

To achieve different shutoff heights, it is consequently furthermore necessary to use and therefore also store different shutoff valves.

EP 1 213 173 A2 describes a system for recovering fuel vapors from a motor vehicle tank comprising a tubular body fastened in the interior from the fuel tank, wherein the tubular body is formed integrally with a fuel tank wall. An interior of the tubular body is in fluid communication with a service duct via an opening wherein the opening is embodied as a through opening through the fuel tank wall. The system furthermore comprises a float arranged inside the tubular body. In the installed position of the fuel tank the float is at a distance from the vent opening when a fuel level within the fuel tank is below a shutoff level, with the result that the float is in an open position and the interior of the tubular body and the service duct are in fluid communication. In the installed position of the fuel tank the float is subject to a lift from the fuel in the interior of the tubular body such that the float is in a closed position and closes the vent opening when a fuel level within the fuel tank is above the shutoff level, with the result that the interior of the tubular body and the service duct are not in a fluid communication via the vent opening.

US 2010/0065134 A1 describes a fuel shutoff valve including a valve chamber, a casing, a float, and a shock absorber. The casing includes a body, a cylinder and a seal. The float is accommodated in the valve chamber. The shock absorber includes a seat attaching to and detaching from the seal of the casing. The shock absorber is connected with the casing via a locker inserted in a guide hole of the casing in that way, that the distance of the shock absorber to the seal of the casing is variable.

DE 10 2010 004 778 A1 describes an oil exit valve for controlling the fluid stream of oil through an opening of a crankcase ventilation arrangement. The valve is realized as a separate member which is not integrally formed with the crankcase ventilation arrangement. The valve comprises a valve plate provided with latching elements which can be passed through an opening of the valve housing.

US 2004/0231720 A1 describes a check valve especially for water cooler assemblies operative at a liquid and gas interface that closes to prevent a substantial flow of liquid beyond the valve but returns to a normally open position upon experiencing a slight vacuum from the liquid originating region.

SUMMARY

It is the underlying object of the present invention to provide an improved operating fluid reservoir which can be produced more quickly and more easily and in which different shutoff heights can be achieved in a particularly simple way.

It is furthermore the object of the present invention to provide an improved method for producing an operating fluid reservoir, by means of which an operating fluid reservoir can be produced with fewer method steps and hence more quickly and at lower cost.

According to the invention, this object is achieved by an operating fluid reservoir having the features indicated in claim 1. Advantageous embodiments are indicated in the claims dependent thereon.

The object underlying the present invention is furthermore achieved by a method for producing an operating fluid reservoir having the features indicated in claim 10.

More specifically, the operating fluid reservoir according to the invention comprises a venting and/or air admission valve, which comprises a hollow valve housing fastened in the interior of the operating fluid reservoir. The venting and/or air admission valve can also be referred to simply as a venting valve or as a shutoff valve. A valve housing interior is in fluid communication with a vent line via a vent opening. The valve housing interior is in fluid communication with the interior of the operating fluid reservoir via at least one ventilation opening. The venting and/or air admission valve furthermore comprises a valve body arranged in the valve housing interior. In the installed position of the operating fluid reservoir, the valve body is at a distance from the vent opening when an operating fluid level within the operating fluid reservoir is below a shutoff level, with the result that the valve body is in an open position and the valve housing interior and the vent line are in fluid communication. On the other hand, in the installed position of the operating fluid reservoir, the valve body is subject to a lift from the operating fluid in the valve housing interior such that the valve body is in a closed position and closes the vent opening when an operating fluid level within the operating fluid reservoir is above the shutoff level, with the result that the valve housing interior and the vent line are not in fluid communication via the vent opening. The operating fluid reservoir according to the invention is characterized in that the valve housing is formed integrally with an operating fluid reservoir wall and the vent opening is embodied as a through opening through the operating fluid reservoir wall. The valve body can furthermore be introduced into the valve housing interior via an introduction opening in the valve housing and the valve body furthermore comprises a holding device, by means of which the valve body is held movably in the valve housing.

The time taken to produce the operating fluid reservoir according to the invention is shortened since an operating reservoir wall is formed integrally with the valve housing and can be produced jointly within just a single method step, e.g. in an injection moulding process. Since the valve housing has an introduction opening which faces away from the operating reservoir wall, the valve body can be introduced easily into the valve housing interior via the introduction opening. By means of the holding device, the valve body is held movably in the valve housing. At a correspondingly low operating fluid level within the operating fluid reservoir, it is thus impossible for the valve body to fall downwards out of the valve housing, when the valve body is subject to little or no lift.

The simple process of pushing the valve body into the valve housing further shortens the time taken to produce the operating fluid reservoir according to the invention. Through appropriate selection of the valve bodies, it is furthermore possible to implement different shutoff heights in a particularly simple manner. Depending on the design of the valve body, said body is subject to a different buoyancy force for one operating fluid level within the operating fluid reservoir, making it possible to achieve different shutoff heights, depending on the valve body. For example, the valve body can have different effective densities.

The at least one ventilation opening is arranged in a side wall of the valve housing. The ventilation opening can be arranged in a lower region of the valve housing, a region remote from the operating fluid reservoir wall, and/or can be arranged in an upper region of the valve housing. There are no restrictions in this respect.

The holding device preferably comprises a latching device, which can be passed through the vent opening into the vent line from the valve housing interior in a process involving elastic deformation of the latching device. During this process, elastic deformation of the latching device occurs when the latching device strikes the periphery of the vent opening and is pushed through the latter. Once the latching device has been pushed completely through the vent opening, the latching device situated in the vent opening or a part of the latching device situated in the vent opening engages behind the operating fluid reservoir wall surrounding the vent opening.

By way of example, the latching device can be implemented by means of two latching tongues, which are separated from one another by a recess in the material, with the result that the two latching tongues are pushed towards one another as they slide through the vent opening. After the latching tongues have passed through the vent opening, the latching tongues return to their initial position owing to the flexible material of which they are composed, with the result that the latching tongues each engage partially behind the operating fluid reservoir wall surrounding the vent opening.

It is also possible for the latching device to be in the form of an arched material surface which is compressed as it is pushed through the vent opening, owing to its arched shape. After passing through the vent opening, the latching surface relaxes again to its original diameter and engages behind the operating fluid reservoir wall surrounding the vent opening.

To this extent, there are no limitations in respect of the latching device.

After passing through the vent opening, the latching device cannot be pulled through the vent opening into the valve housing interior by the vent line, and therefore the valve body is held securely in a movable manner in the valve housing in the absence of lift from an operating fluid.

The corresponding design of the holding device is particularly simple, and the combination or assembly of the valve body with the valve housing is also particularly simple since the valve body has merely to be pushed into the valve housing interior, and the latching device, which is connected to the valve body, has merely to be pushed into the vent line through the vent opening.

At least one latching opening extending radially through the valve housing wall and projecting through the latter is preferably provided in the valve housing. In this case, the holding device comprises at least one latching projection connected to the valve body and extending radially from the valve body. In this case, the valve body can be introduced into the valve housing interior via the introduction opening, and the latching projection can be latched into the latching opening in a process involving elastic deformation of the valve housing and/or of the valve body.

A corresponding configuration of the holding device is also a particularly simple possibility and furthermore makes possible continued use of the entire cross-section of the vent opening for venting of and/or air admission to the interior of the operating fluid reservoir. The axial freedom of movement of the valve body can be adjusted through a corresponding configuration of the latching opening or by means of a corresponding size.

The operating fluid reservoir preferably comprises at least one bypass venting device, by means of which the valve housing interior and the vent line are in fluid communication with one another and/or can be put in fluid communication with one another.

In this case, the bypass venting device is dimensioned in such a way that, when the operating fluid reservoir is filled and, as a result, the operating fluid within the operating fluid reservoir rises as far as the shutoff level, at which the valve body is seated on the valve seat and closes the vent opening, the pressure within the operating fluid reservoir continues to rise owing to the operating fluid column in the filler pipe and is dissipated so slowly via the bypass venting device that the operating fluid column in the filler pipe can rise until it reaches a snifter opening, for example, the result being that the filling process is automatically discontinued when the snifter opening of the fuel pump nozzle is reached by the operating fluid. The pressure produced in the operating fluid reservoir by the fluid column in the filler pipe is dissipated by the bypass venting device, causing the fluid column in the filler pipe to fall again.

The bypass venting device is dimensioned in such a way that, after the liquid level in the filler pipe falls, a second and third addition of fuel can be performed without operating fluid penetrating into the vent line or into the air admission line through the bypass venting device.

The bypass venting device preferably comprises a bypass vent opening, which is formed in the operating fluid reservoir wall, and the valve housing interior is in fluid communication with the vent line via the bypass vent opening, irrespective of the position of the valve body.

A correspondingly designed operating fluid reservoir can be obtained in a particularly simple manner since the bypass vent opening can simply be obtained by means of a correspondingly dimensioned hole in the reservoir wall.

In another preferred embodiment of the operating fluid reservoir, the bypass venting device comprises a bypass vent line connected to the valve housing and/or a bypass vent groove, wherein the valve housing interior is in fluid communication with the vent opening through the bypass vent line and/or the bypass vent groove in the closed position of the valve body.

As an alternative and/or in addition thereto, the bypass venting device comprises a recess in the operating fluid reservoir wall surrounding the vent opening, wherein the valve housing interior is in fluid communication with the vent opening through the recess in the closed position of the valve body.

In the last two preferred variant embodiments, the bypass venting device acts only in the closed position of the valve body, i.e. when the valve body closes the vent opening.

The valve body is preferably of hollow design and has a valve body interior.

In a preferred embodiment of the operating fluid reservoir having a hollow valve body, at least one vent hole, via which the valve body interior is in fluid communication with the valve housing interior, is provided in the valve body.

This configuration of the valve body enables the shutoff height of the air admission and/or venting valve or of the shutoff valve to be adjusted in a particularly simple manner by introducing the vent hole at an appropriate axial height in the valve body.

As the fluid level rises within the operating fluid reservoir, the operating fluid also rises within the valve body as far as the vent hole since, up to this level, the air/gas mixture in the valve body interior can escape through the vent hole. As soon as the operating fluid has risen to such an extent that it closes the vent hole in the valve body, air/gas mixture situated above the vent hole can no longer escape through the vent hole, with the result that the valve body is subject to a buoyancy force proportional to the gas volume within the valve body and the valve body closes the vent opening from a predetermined fluid level within the operating fluid reservoir.

It is thus possible to achieve different shutoff heights with one and the same valve body, which merely has to have vent holes at different positions. Inventory storage is therefore also a particularly simple and low-cost possibility since now only a single valve body has to be used for different tank geometries in which different shutoff heights may have to be implemented.

The object underlying the invention of providing an improved method for producing an operating fluid reservoir is achieved by means of a method for producing an operating fluid reservoir described above, wherein the method comprises the following method steps:

injection moulding or deep drawing a first reservoir shell having an integrated valve housing, which surrounds a vent opening in the reservoir shell;

removing the first reservoir shell from the mould; introducing a valve body into the valve housing via an introduction opening in the valve housing;

latching a holding device of the valve body into a vent opening in the reservoir shell and/or into a latching opening in the valve housing; and connecting the first reservoir shell to a second reservoir shell to form the operating fluid reservoir.

FIGURES

Figure 2A:
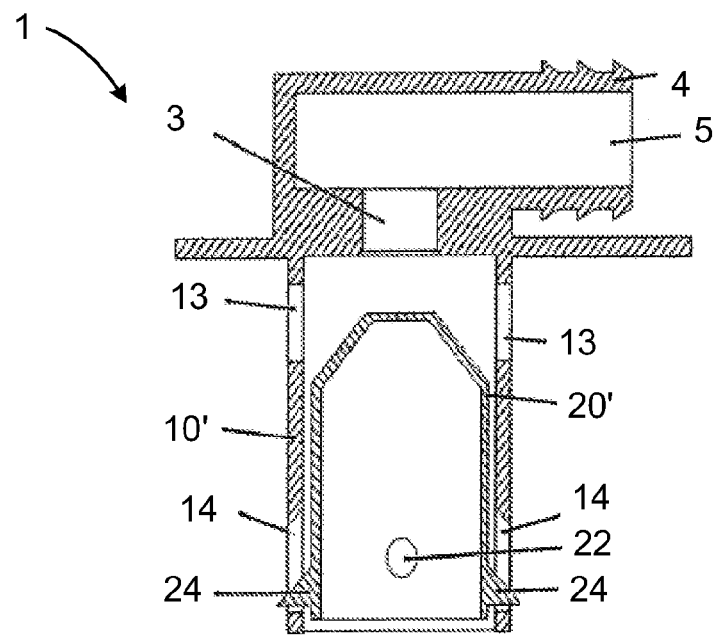
Figure 2B:
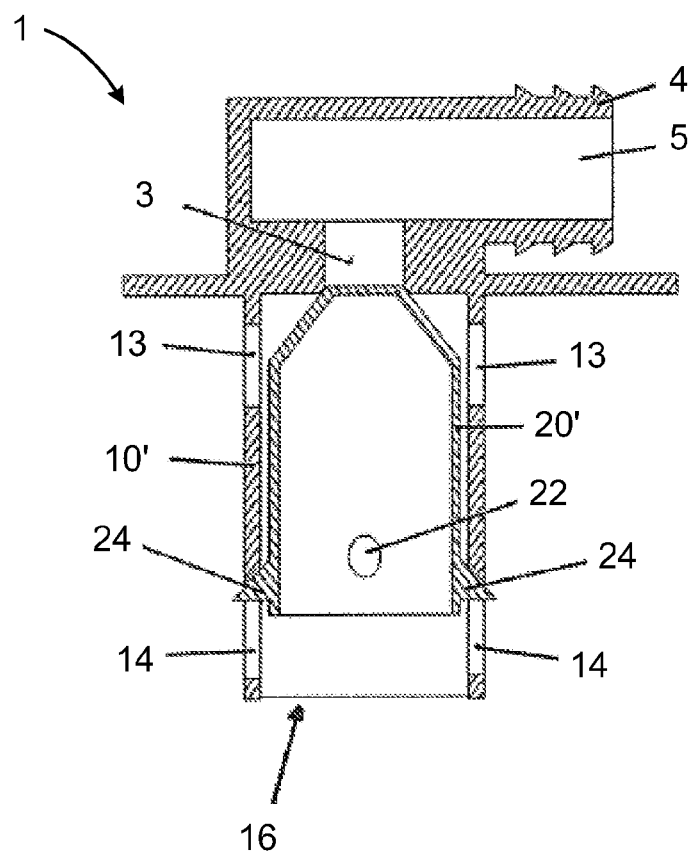
Figure 3:
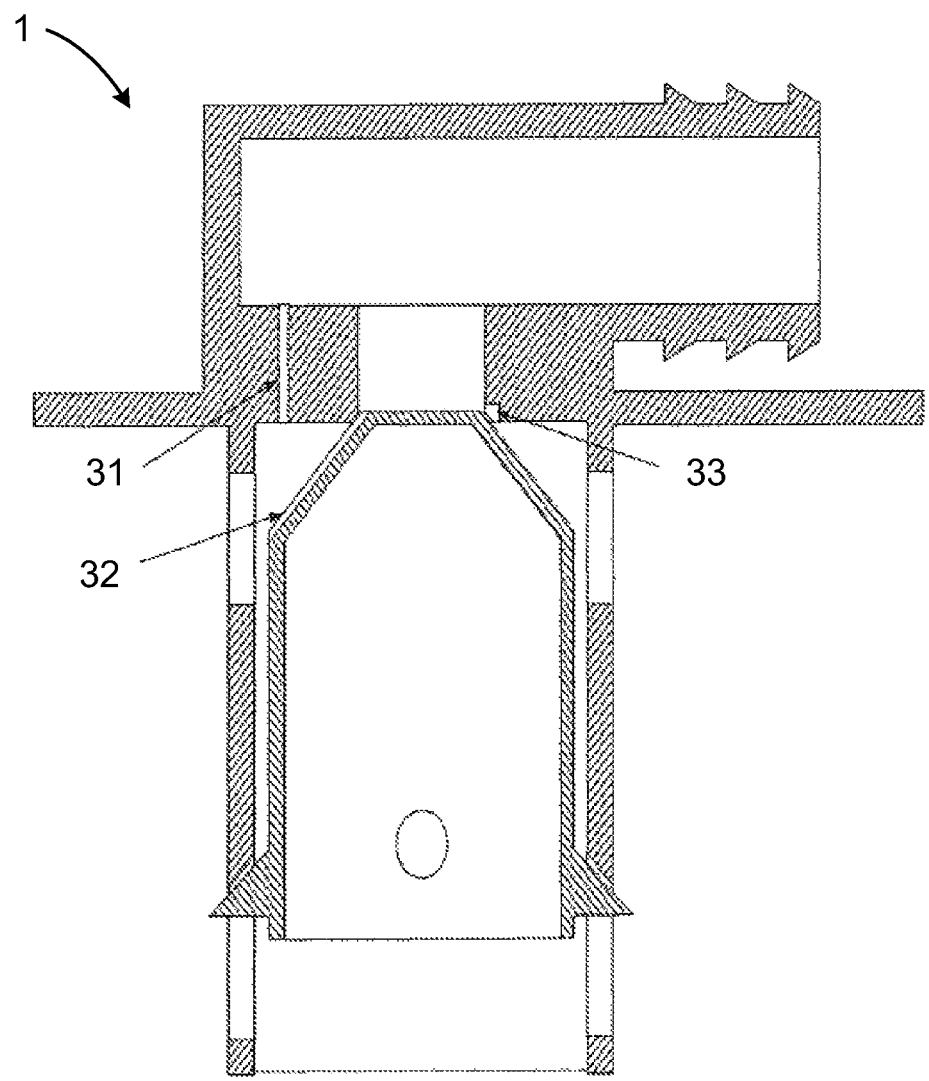

Further advantages, details and features of the invention will become apparent below from the illustrative embodiments explained. In particular:

FIG. 1: shows a cross-section through part of an operating fluid reservoir according to the invention in the region of the venting and/or air admission valve thereof in accordance with a first embodiment of the present invention;

FIG. 2a: shows a cross-section through part of an operating fluid reservoir according to the invention in the region of the venting and/or air admission valve thereof in accordance with a second embodiment of the present invention, wherein the venting and/or air admission valve is in an open state;

FIG. 2b: shows the operating fluid reservoir illustrated in FIG. 2a with the venting and/or air admission valve in the closed state; and FIG. 3: shows a cross-section through the operating fluid reservoir in accordance with the second embodiment with different variants of bypass vent lines, which can likewise be introduced in the operating fluid reservoir in accordance with the first embodiment.

DETAILED DESCRIPTION

In the description which now follows, identical reference signs denote identical components or identical features, and therefore the description given in relation to one figure and relating to one component also applies to the other figures, and therefore repeated description is avoided.

Moreover, reference is made in the following description to a fuel reservoir and to a fuel reservoir wall, although the present invention can be applied in general to operating fluid reservoirs, e.g. in the form of an SCR fluid reservoir.

FIG. 1 illustrates a cross-section through part of an operating fluid reservoir 1 according to the invention in the region of the venting and/or air admission valve thereof in accordance with a first embodiment of the present invention. The venting and/or air admission valve can also be referred to as a shutoff valve.

The shutoff valve comprises a hollow valve housing 10 in the interior of the operating fluid reservoir, said housing being formed integrally with an operating fluid reservoir wall 2. The integral formation of the valve housing 10, which can also simply be referred to and embodied as a guide tube 10, with the operating fluid reservoir wall 2 can be achieved, for example, by injection moulding or deep drawing a reservoir shell of the operating fluid reservoir 1 together with the valve housing 10. Thus, the valve housing 10 is moulded onto the operating fluid reservoir wall 2, for example.

Owing to the hollow configuration of the valve housing 10, said valve housing has a valve housing interior 11 which is in fluid communication via a vent opening 3 with a vent line 5. In this case, the vent opening 3 is embodied as a through opening 3 through the operating fluid reservoir wall 2. The vent line 5 is formed in a vent connection 4, onto which a vent hose, for example, is pushed or can be secured thereon, it being possible for said hose to be in fluid communication with an activated carbon filter or a filler pipe head, for example, where the operating fluid reservoir 1 is embodied as a fuel reservoir 1.

In the illustrative embodiment shown, the valve housing interior 11 is in fluid communication with the interior of the operating fluid reservoir via two ventilation openings 13. Consequently, an air/gas mixture and a liquid can be exchanged between the valve housing interior 11 and the interior of the operating fluid reservoir via the ventilation openings 13.

Arranged in the valve housing interior 11 of the shutoff valve is a valve body 20, which is held movably in the valve housing interior 11 by means of a holding device 23, wherein the valve body 20 is held in such a way that it can be moved relative to the valve housing 10 along the longitudinal axis of the latter.

The valve body 20 can be introduced into the valve housing interior 11 via an introduction opening 16 remote from the operating fluid reservoir wall 2. In the embodiment illustrated in FIG. 1, the latching device 23 is implemented in the form of two latching tongues 23, which are separated from one another by a recess in the material. Owing to the recess in the material between the two latching tongues 23, said tongues can be deformed elastically towards one another.

As the valve body 20 is pushed into the valve housing interior 11, the upper head region of the latching device 23 strikes against the vent opening 3. Owing to the tapered embodiment of the two latching tongues 23 and owing to the tapered embodiment of the vent opening facing the valve housing interior 11, the two latching tongues 23 are pushed towards one another by being pushed into the vent opening, thus allowing the two latching tongues 23 to be pushed through the vent opening 3 while being elastically deformed. Once the upper region of the latching tongues 23 with the radially thickened portions thereof have passed through the vent opening 3, the two latching tongues 23 are moved back into their original position by virtue of their elasticity. Consequently, the latching tongues 23 engage behind the operating fluid reservoir wall 2 surrounding the vent opening 3.

Thus, the valve body 20 cannot easily be pulled out of the valve housing 10, this having the result that, in the case of a low operating fluid level within the operating fluid reservoir, at which the valve body 20 is not subject to any lift, the valve body 20 does not fall downwards out of the valve housing 10.

From FIG. 1, it can be seen that a vent opening 22, via which the valve body interior 21 is in fluid communication with the valve housing interior 11, is provided in the valve body 20.

The shutoff valve illustrated in FIG. 1 operates in such a way that, as the fluid level within the operating fluid reservoir 1 rises, the fluid level in the valve body 21 also rises, until the operating fluid closes the vent opening 22. The reason is that, as long as the vent opening 22 is not covered by the operating fluid, the air/gas mixture in the valve body interior 21 can escape via the vent opening 22 into the valve housing interior 11. The air/gas mixture in the valve housing interior 11 is carried away to the activated carbon filter or to a filler pipe head via the vent opening 3 and the vent line 5.

Once the operating fluid has covered the vent opening 22, the air/gas mixture situated above the vent opening 22 can no longer escape, with the result that the valve body 20 is subject to a buoyancy force dependent on the fluid level. As long as the valve body 20 does not close the vent opening 3, the air/gas mixture in the operating fluid reservoir can be carried away via the vent line 5 during the filling process of said operating fluid reservoir, and therefore there is only a predetermined excess pressure in the interior of the operating fluid reservoir during a filling process.

After a predetermined fluid level within the operating fluid reservoir 1 has been reached, the valve body 20 is subject to a lift such that the valve body 20 closes the through opening 3. From this level onwards, fluid exchange between the valve housing interior 11 and the vent line 5 via the through opening 3 is no longer possible. Introducing more operating fluid into the operating fluid reservoir 1 via a filler pipe causes the gas pressure within the operating fluid reservoir 1 to rise, with the result that the fluid level in the filler pipe rises until, for example, it reaches a snifter opening of a fuel pump nozzle, thus allowing the process of filling the operating fluid reservoir 1 to be ended automatically.

The lift to which the valve body 22 is subject is determined by the volume of the valve body interior 21, by the selection of material for the valve body 20 and by the position of the vent opening 22. The lift to which the valve body 22 is subjected by the operating fluid can be influenced by the position of the vent opening 22, making it possible to achieve different shutoff heights.

According to the invention, the distance between the operating fluid level and the fuel reservoir inner wall connected to the valve housing 10 at which the valve body 20 is subject to so much lift by the operating fluid that it closes the vent opening 3 is referred to as the shutoff height.

The further up the vent opening 22 is arranged in the valve body 20 (in the installed position), the later is the vent opening 22 closed by the operating fluid during a filling process. Consequently, the further up the vent opening 22 is positioned in the valve body 20, the lower is the shutoff height achieved.

From FIG. 1, it can be seen that a bypass device 31 in the form of a bypass vent opening 31 is formed in the operating fluid reservoir wall 2. The bypass vent opening 31 is designed as a through-hole 31 between the valve housing interior 11 and the vent line 5. Consequently, the valve housing interior 11 and the vent line 5 are in fluid communication with one another, irrespective of the position of the valve body 20.

The bypass vent opening 31 is dimensioned in such a way that, as the operating fluid reservoir 1 is filled and as the operating fluid level within the operating fluid reservoir 1 rises as far as the shutoff level as a result, the pressure within the operating fluid reservoir 1 continues to rise and is dissipated via the bypass vent opening 31 only at a rate which is so slow that the operating fluid column in the filler pipe can rise until it reaches a snifter opening, for example, with the result that the filling process is ended automatically when the snifter opening of the fuel pump nozzle is reached by the operating fluid. The pressure produced in the operating fluid reservoir 1 by the fluid column in the filler pipe is dissipated via the bypass vent opening 31, with the result that the fluid column in the filler pipe falls again.

The bypass vent opening 31 is dimensioned in such a way that, once the fluid level in the filler pipe has fallen, a second and a third addition of fuel can be performed without the operating fluid penetrating into the vent line 5 through the bypass vent opening 31.

A second embodiment of the operating fluid reservoir 1 according to the invention is illustrated in FIGS. 2a and 2b, wherein only the venting and/or air admission valve is of different design to that in the first illustrative embodiment shown in FIG. 1.

In FIG. 2a, the venting and/or air admission valve is shown in a state in which the valve body 20 is at a distance from the vent opening 3, with the result that fluid exchange between the valve housing interior 11 and the vent line 5 is possible. FIG. 2b shows the same venting and/or air admission valve, wherein the valve body 20 is subject to such a lift by the operating fluid that the valve body 20 closes the vent opening 3.

In the shutoff valve shown in FIGS. 2a and 2b, the holding device is of different design to that in the shutoff valve illustrated in FIG. 1. The latching device or holding device comprises one or more latching projections 24 connected to the valve body 20 and extending radially from the valve body 20. A number of latching openings 14 corresponding to the number of latching projections 24 is provided in the valve housing 10. The valve body 20 can furthermore be introduced into the valve housing interior 11 via the introduction opening 16 and can be latched into the latching opening 14 in a process involving elastic deformation of the valve housing 10 and/or of the valve body 20 and/or of the latching projections 24.

In other respects, the mode of operation is identical with that of the operating fluid reservoir 1 in accordance with the first embodiment. To this extent, attention is drawn to the corresponding explanations.

The operating fluid reservoir 1 illustrated in FIG. 2b is shown once again on an enlarged scale in FIG. 3. From FIG. 3, it can be seen that the bypass venting device does not necessarily have to be designed only as a bypass vent opening 31. The bypass venting device can be designed as a bypass vent line 32 and/or bypass vent groove 32 formed with the valve housing 10, for example. In the closed position of the valve body 20, the valve housing interior 11 is in fluid communication with the vent opening 3 through the bypass vent line 32 and/or the bypass vent groove 32. Consequently, the bypass vent line 32 and/or the bypass vent groove 32 acts only in the closed position of the valve body 20.

In addition and/or alternatively to the bypass vent opening 31 and/or bypass vent line 32 and/or bypass vent groove 32, the bypass venting device can also be designed as a recess 33 in the operating fluid reservoir wall 2 surrounding the vent opening 3, wherein the valve housing interior 11 is in fluid communication with the vent opening 3 through the recess 33 in the closed position of the valve body.

The statements relating to the dimensioning of the bypass vent opening 31 which were made with reference to FIG. 1 also apply to the bypass vent line 32, the bypass vent groove 32 and the recess 33.

LIST OF REFERENCE SIGNS 1 operating fluid reservoir
2 operating fluid reservoir wall/fuel reservoir wall
3 vent opening/through opening (in the operating fluid reservoir wall)
4 vent connection
5 vent line
10 valve housing/guide tube
11 valve housing interior
13 ventilation opening
14 latching opening (of the valve housing)
15 valve seat
16 introduction opening (of the valve housing)
20 valve body/buoyant body/float
21 valve body interior
22 vent opening/vent hole
23 holding device/latching device/latching tongue
24 holding device/latching device/latching projection
31 bypass venting device, bypass vent opening
32 bypass venting device, bypass vent line/bypass vent groove
33 bypass vent line, recess

What is claimed is:
1. An operating fluid reservoir comprising:
a venting and/or an air admission valve, wherein the venting and/or air admission valve comprises a hollow valve housing located in an interior of the operating fluid reservoir, wherein the valve housing includes a valve housing interior;
the valve housing interior in fluid communication with a vent line via a vent opening;
the valve housing interior in fluid communication with the interior of the operating fluid reservoir via at least one ventilation opening;
the venting and/or air admission valve comprises a valve body arranged in the valve housing interior;
in an installed position of the operating fluid reservoir, the valve body is at a distance from the vent opening when an operating fluid level within the operating fluid reservoir is below a shutoff level, with the result that the valve body is in an open position and the valve housing interior and the vent line are in fluid communication;
in the installed position of the operating fluid reservoir, the valve body is subject to a lift from the operating fluid in the valve housing interior such that the valve body is in a closed position and closes the vent opening when an operating fluid level within the operating fluid reservoir is above the shutoff level, with a result that the valve housing interior and the vent line are not in fluid communication via the vent opening;

the valve housing formed integrally with an operating fluid reservoir wall;

the vent opening embodied as a through opening through the operating fluid reservoir wall;

the valve body introducible into the valve housing interior via an introduction opening in the valve housing;

the valve body comprises a holding device, by which the valve body is held movably in the valve housing;

the holding device comprises a latching device passable through the vent opening into the vent line from the valve housing interior in a process involving elastic deformation of the latching device; and the latching device situated in the vent opening engages behind the operating fluid reservoir wall surrounding the vent opening.

2. The operating fluid reservoir according to claim 1, wherein the operating fluid reservoir comprises at least one bypass venting device, by which the valve housing interior and the vent line are in fluid communication with one another and/or are placeable in fluid communication with one another.

3. The operating fluid reservoir according to claim 2, wherein the bypass venting device is configured as a bypass vent opening in the operating fluid reservoir wall, by which the valve housing interior is in fluid communication with the vent line, irrespective of the position of the valve body.

4. The operating fluid reservoir according to claim 2, wherein the bypass venting device comprises a bypass vent line connected to the valve housing and/or a bypass vent groove, wherein the valve housing interior is in fluid communication with the vent opening through the bypass vent line and/or the bypass vent groove in the closed position of the valve body.

5. The operating fluid reservoir according to claim 2, wherein the bypass venting device is configured as a recess in the operating fluid reservoir wall surrounding the vent opening, wherein the valve housing interior is in fluid communication with the vent opening through the recess in the closed position of the valve body.

6. The operating fluid reservoir according to claim 1, wherein the valve body is of hollow design and has a valve body interior.

7. The operating fluid reservoir according to claim 6, wherein at least one vent opening, via which the valve body interior is in fluid communication with the valve housing interior, is provided in the valve body.

8. A method for producing an operating fluid reservoir, comprising:

injection moulding or deep drawing a first reservoir shell having an integrated hollow valve housing, which surrounds a vent opening in the first reservoir shell;

introducing a valve body into the valve housing via an introduction opening in the valve housing;

latching a holding device comprising a latching device of the valve body into the vent opening in the first reservoir shell in a process involving elastic deformation of the latching device, so that the latching device situated in the vent opening engages behind the first reservoir shell surrounding the vent opening; and connecting the first reservoir shell to a second reservoir shell to form the operating fluid reservoir;

wherein the valve housing and the valve body are components of a venting and/or an air admission valve;

wherein the valve housing is located in an interior of the operating fluid reservoir;

wherein the valve housing includes a valve housing interior, the valve housing interior in fluid communication with a vent line via the vent opening;

wherein the valve housing interior is in fluid communication with the interior of the operating fluid reservoir via at least one ventilation opening;

wherein the valve body is arranged in the valve housing interior;

wherein, in an installed position of the operating fluid reservoir, the valve body is at a distance from the vent opening when an operating fluid level within the operating fluid reservoir is below a shutoff level, with the result that the valve body is in an open position and the valve housing interior and the vent line are in fluid communication;

wherein, in the installed position of the operating fluid reservoir, the valve body is subject to a lift from the operating fluid in the valve housing interior such that the valve body is in a closed position and closes the vent opening when an operating fluid level within the operating fluid reservoir is above the shutoff level, with a result that the valve housing interior and the vent line are not in fluid communication via the vent opening;

wherein the valve housing is formed integrally with an operating fluid reservoir wall;

wherein the vent opening is embodied as a through opening through the operating fluid reservoir wall;

wherein the valve body is introducible into the valve housing interior via the introduction opening in the valve housing;

wherein the valve body is held movably in the valve housing by the holding device;

wherein the latching device is passable through the vent opening into the vent line from the valve housing interior upon the elastic deformation of the latching device; and wherein the latching device situated in the vent opening engages behind the operating fluid reservoir wall surrounding the vent opening.

9. The method for producing an operating fluid reservoir according to claim 8, wherein the operating fluid reservoir comprises at least one bypass venting device, by which the valve housing interior and the vent line are in fluid communication with one another and/or are placeable in fluid communication with one another.

10. The method for producing an operating fluid reservoir according to claim 9, wherein the bypass venting device is configured as a bypass vent opening in the operating fluid reservoir wall, by which the valve housing interior is in fluid communication with the vent line, irrespective of the position of the valve body.

11. The method for producing an operating fluid reservoir according to claim 9, wherein the bypass venting device comprises a bypass vent line connected to the valve housing and/or a bypass vent groove, wherein the valve housing interior is in fluid communication with the vent opening through the bypass vent line and/or the bypass vent groove in the closed position of the valve body.

12. The method for producing an operating fluid reservoir according to claim 9, wherein the bypass venting device is configured as a recess in the operating fluid reservoir wall surrounding the vent opening, wherein the valve housing interior is in fluid communication with the vent opening through the recess in the closed position of the valve body.

13. The method for producing an operating fluid reservoir according to claim 8, wherein the valve body is of hollow design and has a valve body interior.

14. The method for producing an operating fluid reservoir according to claim 13, wherein at least one vent opening, via which the valve body interior is in fluid communication with the valve housing interior, is provided in the valve body.

* * * * *